US009460058B2

(12) United States Patent
Maertens et al.

(10) Patent No.: US 9,460,058 B2
(45) Date of Patent: Oct. 4, 2016

(54) OPERATING SYSTEM SUPPORT FOR LOCATION CARDS

(71) Applicant: Microsoft Corporation, Redmond, WA (US)

(72) Inventors: Katherine A. Maertens, Redmond, WA (US); Yekaterina Grabar, Seattle, WA (US); Carter Green, Redmond, WA (US); Finbarr Duggan, Bray (IE); Silvana P. Moncayo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

(21) Appl. No.: 14/475,383

(22) Filed: Sep. 2, 2014

(65) Prior Publication Data

US 2016/0062955 A1 Mar. 3, 2016

(51) Int. Cl.
*G06F 3/0484* (2013.01)
*G06F 17/21* (2006.01)
*G01C 21/26* (2006.01)
*G06F 17/24* (2006.01)
*H04W 4/20* (2009.01)

(52) U.S. Cl.
CPC ............ *G06F 17/212* (2013.01); *G01C 21/26* (2013.01); *G06F 3/0484* (2013.01); *G06F 17/243* (2013.01); *H04W 4/20* (2013.01)

(58) Field of Classification Search
CPC .................................................. G06F 3/0484
USPC ........................................................ 235/380
See application file for complete search history.

(56) References Cited

U.S. PATENT DOCUMENTS

| 6,321,158 B1 | 11/2001 | DeLorme et al. |
| 8,010,279 B2 | 8/2011 | Kobuya et al. |
| 8,103,445 B2 | 1/2012 | Smith et al. |
| 8,972,187 B1 * | 3/2015 | Steinmetz ............ G01C 21/00 701/533 |

(Continued)

FOREIGN PATENT DOCUMENTS

WO WO 2013/122840 8/2013

OTHER PUBLICATIONS

Internet Engineering Task Force, "vCard Format Specification" RFC 6350, 74 pp. (2011).

(Continued)

*Primary Examiner* — Christle I Marshall
(74) *Attorney, Agent, or Firm* — Bryan Webster; Judy Yee; Micky Minhas

(57) ABSTRACT

Innovations in the area of presentation of location-related actions and location information are presented. For example, an application calls an operating system to generate a location card. The location card can show a map of a location as well as additional information about the location and one or more action indicators. With an action indicator, a user can launch an application to perform an action related to the location immediately and directly from the location card. Depending on usage scenario, an application can specify different actions to be represented with action indicators in a location card. At the same time, location cards supported by the operating system provide a consistent way to expose location information and location-related actions to users.

23 Claims, 12 Drawing Sheets

(56) References Cited

U.S. PATENT DOCUMENTS

| | | | |
|---|---|---|---|
| 2009/0112474 A1* | 4/2009 | Chakrapani | G01C 21/32 702/5 |
| 2009/0327078 A1 | 12/2009 | Ohazama et al. | |
| 2010/0131850 A1 | 5/2010 | Berus | |
| 2011/0227699 A1* | 9/2011 | Seth | G06Q 30/02 340/8.1 |
| 2012/0042036 A1 | 2/2012 | Lau et al. | |
| 2012/0095979 A1 | 4/2012 | Aftab et al. | |
| 2012/0229505 A1 | 9/2012 | Kuga | |
| 2014/0025291 A1* | 1/2014 | Lee | G01C 21/3682 701/454 |
| 2014/0365944 A1* | 12/2014 | Moore | G06F 3/0484 715/772 |
| 2015/0099481 A1* | 4/2015 | Maitre | H04W 4/22 455/404.2 |
| 2015/0193416 A1* | 7/2015 | Hagiwara | G06F 17/241 715/202 |

OTHER PUBLICATIONS

Plotter, "Create, Share & Discover Maps of All Kinds," downloaded from the World Wide Web, 9 pp. (document marked 2014).

Google, "Google Now," downloaded from the World Wide Web, 4 pp. (document not dated—downloaded on Sep. 4, 2015).

Spradlin, "Google Now is Getting Ready to Give You Cards From Third Party Apps," downloaded from the World Wide Web, 9 pp. (Jan. 2015).

Triggs, "Google Now Open—API Will Support Cards From Any App," downloaded from the World Wide Web, 3 pp. (Mar. 2015).

Whitwam, "Google Plans to Release Open API for Google Now Cards," downloaded from the World Wide Web, 9 pp. (Mar. 2015).

Wikipedia, "Google Now," downloaded from the World Wide Web, 5 pp. (document marked as "last modified Sep. 2, 2015").

International Search Report and Written Opinion dated Jan. 19, 2016, from International Patent Application No. PCT/US2015/048023, 10 pp.

* cited by examiner

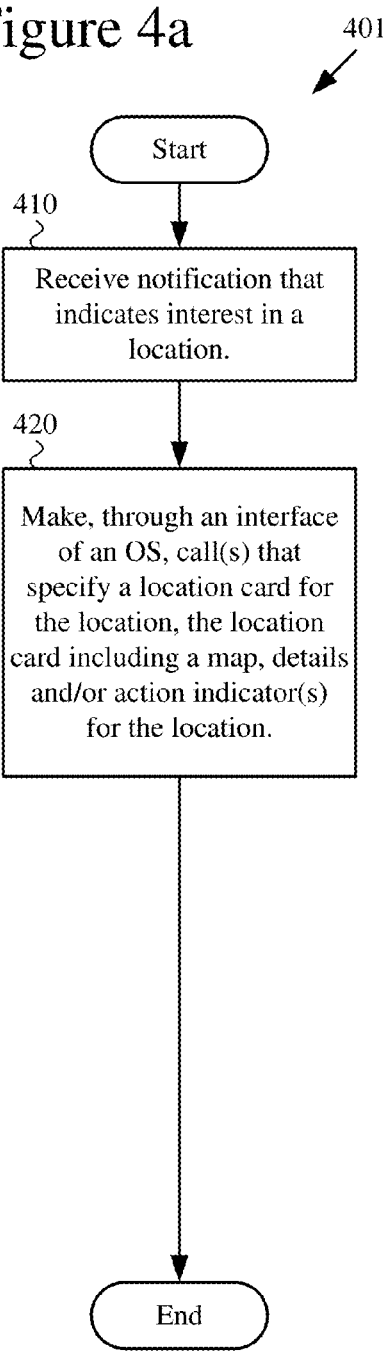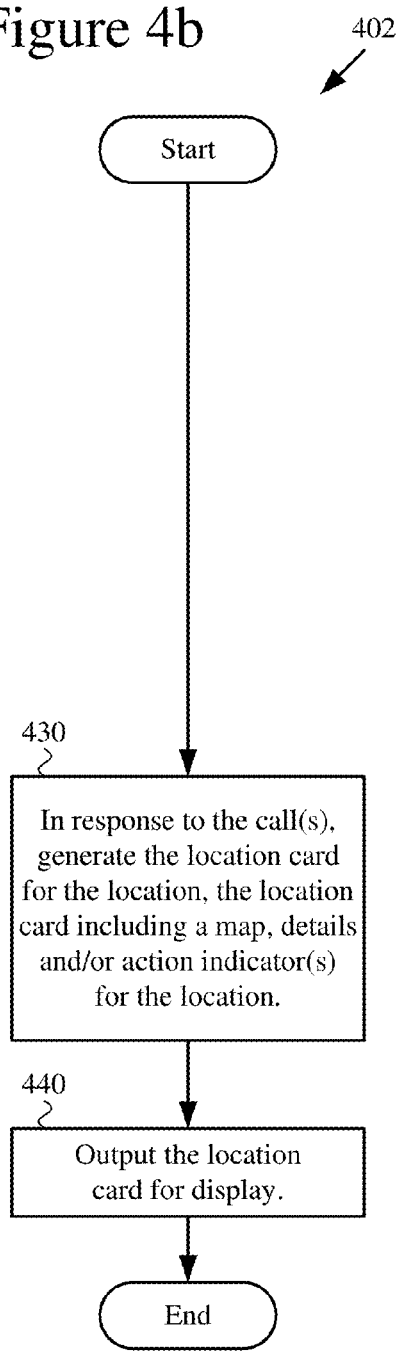

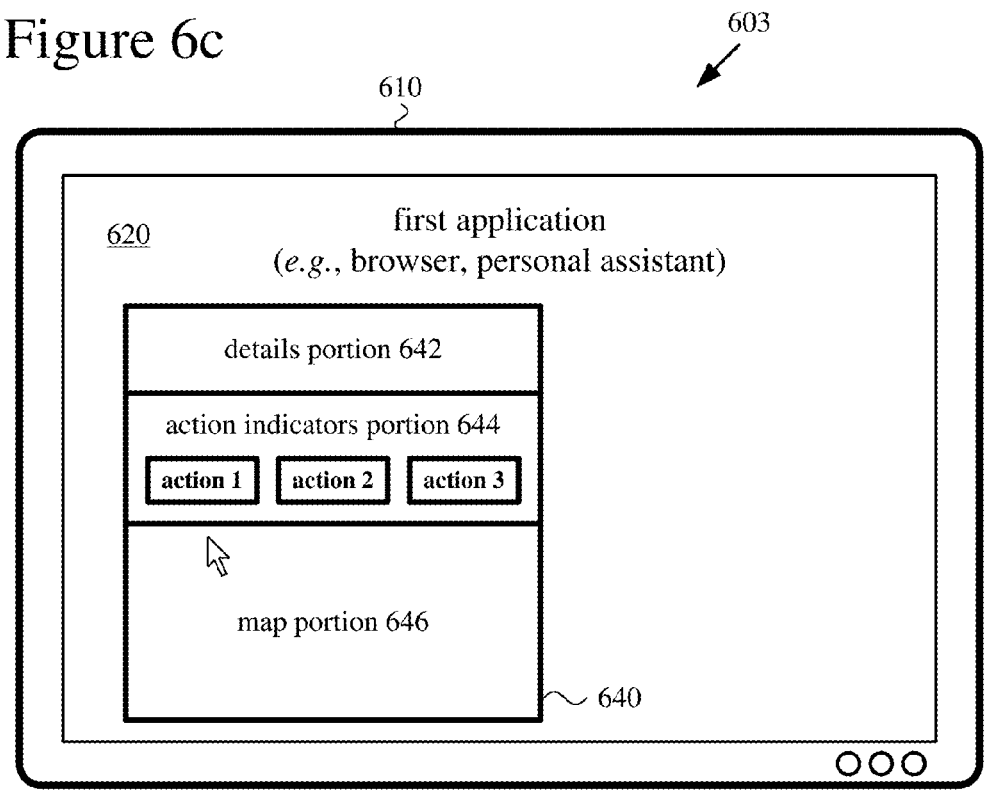
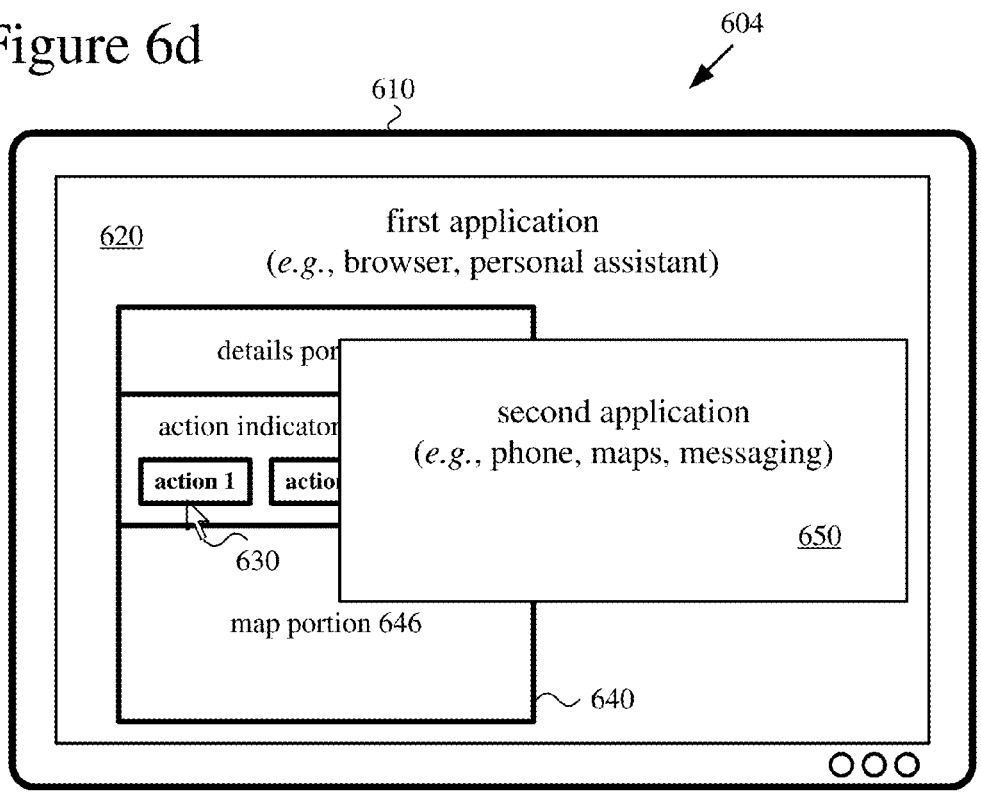

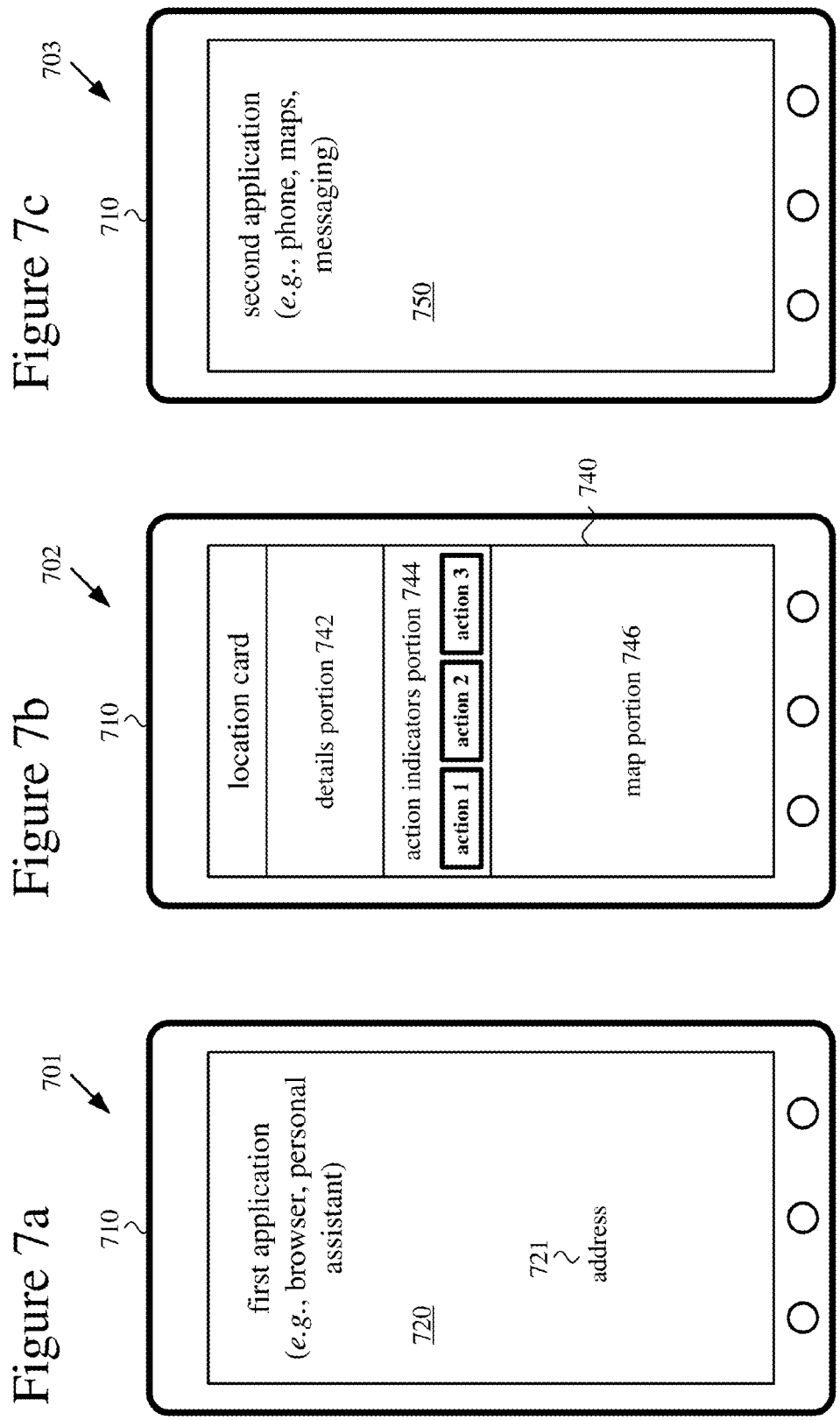

Figure 8c
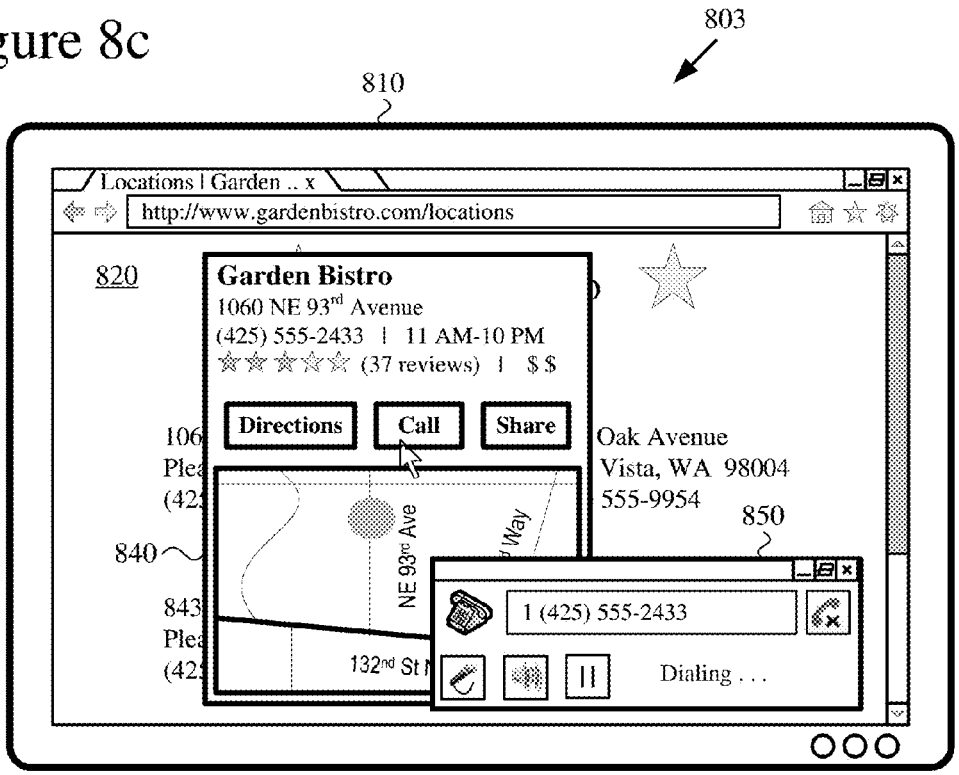
Figure 9
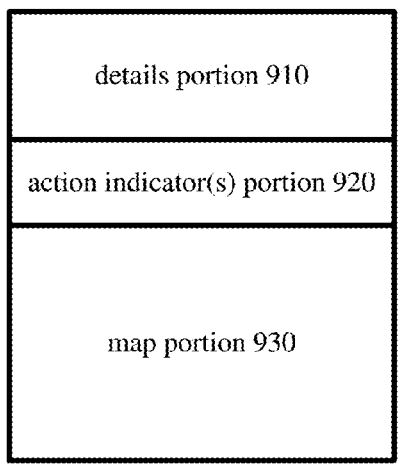
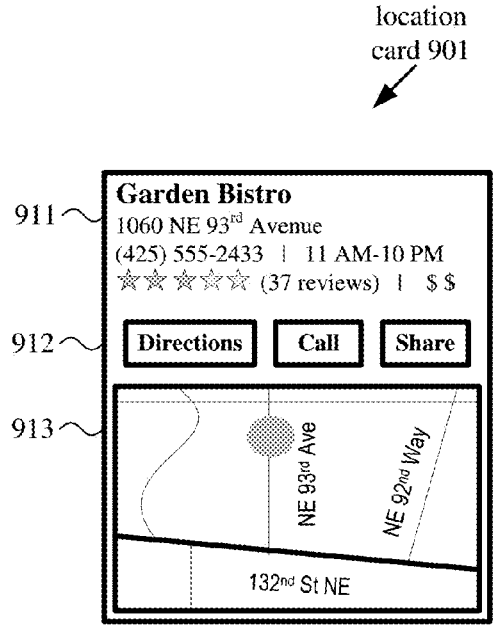

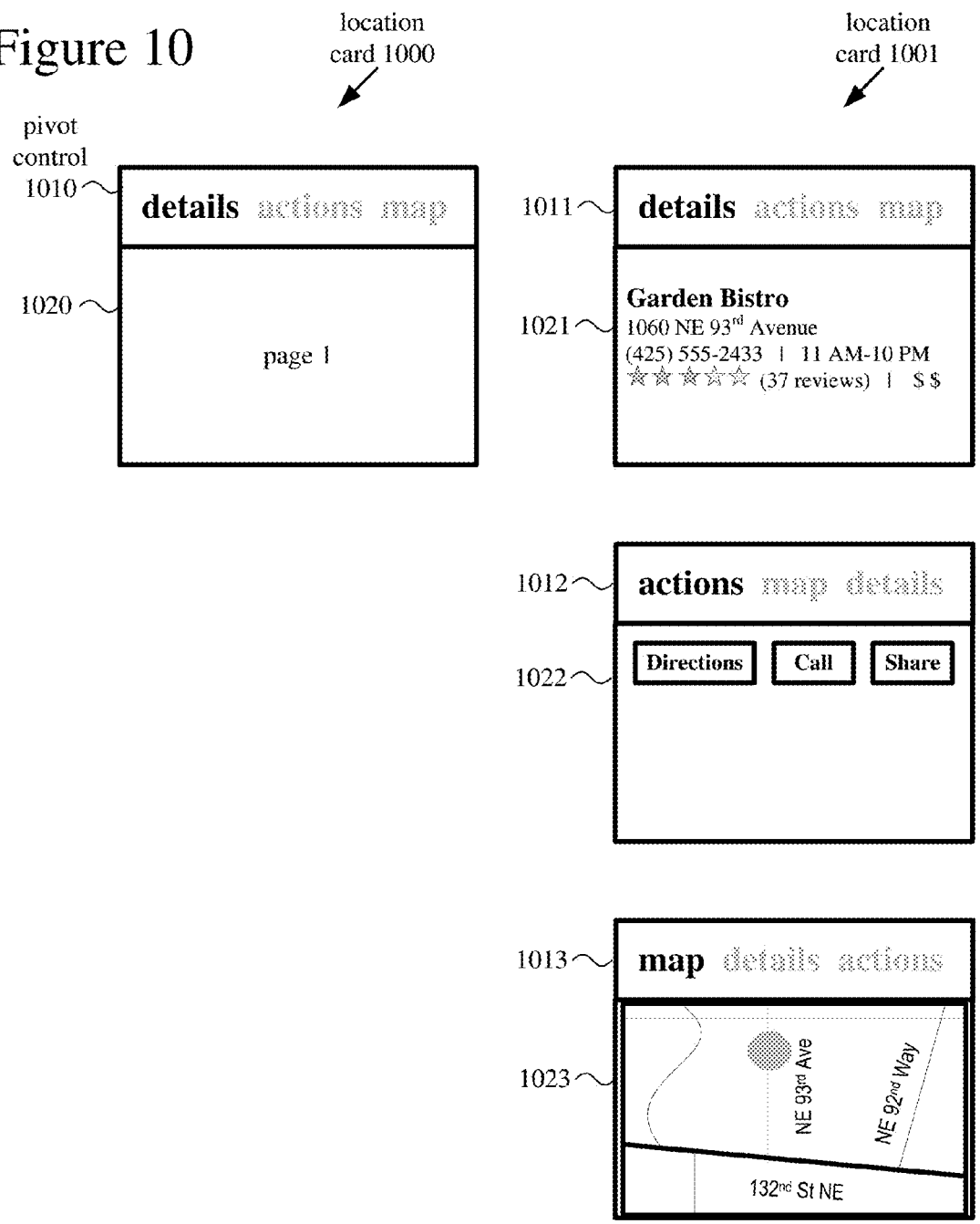

OPERATING SYSTEM SUPPORT FOR LOCATION CARDS

BACKGROUND

Mapping applications are commonly used in smartphones and other mobile computing devices. Typically, a mapping application requests map information from a mapping service, then presents a graphical representation of the map information. Within a mapping application, a user can view various types of maps (e.g., street view, aerial view), search for an address, search for a specific location, search for a type of location, retrieve directions to reach a location, view traffic conditions, or perform another navigation-related action.

While mapping application are useful for performing navigation-related actions, in many cases, they cannot perform more complicated tasks that incorporate other, non-navigation actions. For example, a user might (1) use a Web browser to find a location, (2) open a mapping application to get map information and directions to the location, (3) open another application to read a review about the location, (4) open a telephone application to call a business at the location, and then (5) open a messaging application to share information about the location with a friend. When switching between applications, the user often has to copy relevant information (e.g., address, name of business, telephone number) from one application to another in order to use that information in the other application. Thus, to complete a complicated series of actions, the user finds an application suitable for an action, starts the application, copies information, and performs the action, then continues with the next application for the next action, and so on, until the series of actions is completed. Aside from the number of steps, the user switches between different contexts, which can be confusing and result in loss of information.

An application such as a Web browser or software-based personal assistant can "host" a map. In this case, the map is presented in the application's screen area. For example, the application requests map information from a mapping service, then graphically presents the map information in part of its screen area. In many cases, actions that relate to a location in the map (e.g., getting directions, calling a telephone number, sharing the location) are not exposed to the user by the application. As a result, switching to other applications adds steps for the user (to launch the other applications, copy information between applications, and perform the actions). In a few cases, an application such as a Web browser or software-based personal assistant can expose location-related actions to the user, but the actions are presented in an application-specific way. Location-related actions are not presented in a consistent way from application to application. Thus, the user experience is not consistent between applications, which can be confusing to a user.

SUMMARY

In summary, the detailed description presents innovations in the area of presentation of location-related actions and location information. For example, an application calls an operating system ("OS") to generate a location card, which can include a map of a location as well as additional information about the location and one or more action indicators. With an action indicator, a user can launch an application to perform an action related to the location immediately and directly from the location card, without manually finding an application, launching the application, copying relevant information between applications, and initiating the action. Depending on usage scenario, an application that requests a location card can specify different actions to be represented with action indicators in the location card. At the same time, location cards supported by the OS provide a consistent way to expose location information and location-related actions to users from application to application.

According to one aspect of the innovations described herein, in response to one or more calls through an interface of an OS, the OS generates a location card for a location. The location card can include (a) a map for the location; (b) details about the location; and/or (c) one or more action indicators. Each of the action indicator(s) is linked to an application capable of performing a corresponding action. For example, when it generates the location card, the OS creates a structure in memory of a computing system. The structure defines visual elements and attributes for a map, visual elements and attributes for additional details, and visual elements and attributes for action indicator(s).

The call(s) to the OS provide information about the location card. For example, the call(s) provide: (1) one or more parameters that specify a type of the map; (2) one or more parameters that specify the details about the location; (3) one or more parameters that specify, for each of the action indicator(s), the linked application and the corresponding action; (4) one or more parameters that specify one or more of font size, font color, font type, border width, border color, border type, height, width, position and background color for the location card; and/or (5) one or more parameters that specify a template for the location card. When it generates the location card, the OS can select a template for the location card, and then populate at least some fields of the template using one or more parameters provided in the call(s). Other fields of the template can have default values.

The OS can adjust the location card depending on various factors. For example, the OS evaluates size and/or orientation of a screen of a display device of the computing system, and then adjusts the location card based at least in part on results of the evaluating. Or, as another example, the OS determines which of the map, the additional details and the action indicator(s) to include in the location card based on priority information, and then adjusts the location card based at least in part on results of the evaluating.

After generating the location card, the OS outputs the location card for display. For example, the OS renders the location card to a surface, compositing the various elements of the location card onto the surface, which is used to update a screen of a display device. The location card can be rendered in various ways. For example, the location card can replace (on the surface to be displayed) the content of an application that requested the location card. In this case, when the user closes the location card, the OS removes the location card from display (updating the surface to be displayed) and outputs the previous content of the application for display. Or, the location card can be rendered for display as a flyout object on top of other content previously rendered for display (on the surface to be displayed). In this case, when the user provides user input outside the flyout object, the OS removes the flyout object from display (updating the surface to be displayed) and outputs the other content for display. A location card can be displayed individually. Or, the location card can be part of a stack of multiple location cards that are output for display.

After outputting the location card for display, the OS may receive user input to actuate an action indicator. For example, in response to actuation of a given action indicator, the OS launches the application linked to the given action indicator, and provides information to the launched application in order for the launched application to perform the corresponding action for the given action indicator. The OS can also output a view of the launched application (e.g., if the application is not running as a background task) for display. Later, after the action has been performed and the launched application has been closed, the OS can remove the view, if any, of the launched application (updating the surface to be displayed) and output the location card for display again.

According to another aspect of the innovations described herein, an application receives a notification that indicates interest in a location. For example, the notification is user input such as mouse input or touchscreen input over a representation of the location on a screen of a display device of the computing system. Or, the notification received by the application is an event triggered within the application, based on an association recognized by the application between the location and a user profile or user preferences.

In response to the notification, the application makes, through an interface of an OS, one or more calls that specify a location card for the location. The location card can include (a) a map for the location; (b) details about the location; and/or (c) one or more action indicators. Each of the action indicator(s) is linked to an application capable of performing a corresponding action. The action indicator(s) can all represent primary actions, to be presented directly in the location card. Or, in addition to any action indicators for primary actions, the action indicator(s) can include at least one action indicator for a secondary action, which is not to be presented directly in the location card but is accessible using the location card.

The call(s) provide information about the location card. For example, the call(s) provide: (1) one or more parameters that specify a type of the map; (2) one or more parameters that specify the details about the location; (3) one or more parameters that specify, for each of the action indicator(s), the linked application and the corresponding action; (4) one or more parameters that specify one or more of font size, font color, font type, border width, border color, border type, height, width, position and background color for the location card; and/or (5) one or more parameters that specify a template for the location card.

The application can adjust the call(s) that specify the location card depending on various factors. For example, the application evaluates size and/or orientation of a screen of a display device of the computing system, and then adjusts one or more of the call(s) that specify the location card based at least in part on results of the evaluating. Or, as another example, the application evaluates one or more settings and/or one or more conditions of the computing system, and then, based on results of the evaluating, determines a type of the map. Or, as another example, the application determines a custom view of the location, where the custom view is used as the map for the location. Or, as another example, the application requests a search for an address of the location, receives results of the search, and filters the results of the search to determine the details about the location to include in the location card. Or, as another example, for each of the one or more action indicators, the application identifies relevant information about the location, determines the corresponding action for the relevant information, and determines the application capable of performing the corresponding action.

The innovations can be implemented as part of a method, as part of a computing system adapted to perform the method or as part of tangible computer-readable media storing computer-executable instructions for causing a computing system to perform the method. The various innovations can be used in combination or separately.

The foregoing and other objects, features, and advantages of the invention will become more apparent from the following detailed description, which proceeds with reference to the accompanying figures.

BRIEF DESCRIPTION OF THE DRAWINGS

FIGS. 4a and 4b are flowcharts illustrating generalized techniques for requesting a location card and generating a location card, respectively.

FIGS. 6a-6d, 7a-7c and 8a-8c are diagrams illustrating examples of creation and uses of location cards.

FIGS. 9, 10. 11a-11d and 12 are diagrams illustrating example configurations of location cards.

DETAILED DESCRIPTION

The detailed description presents innovations in the area of presentation of location-related actions and location information. For example, an application calls an operating system ("OS") to generate a location card. The location card can show a map of a location as well as additional information about the location and one or more action indicators. With an action indicator, a user can launch an application to perform a location-related action immediately and directly from the location card, without manually finding an application, launching the application, copying relevant information between applications, and initiating the action. Depending on usage scenario, an application can specify different actions to be represented with action indicators in a location card. At the same time, location cards supported by the OS provide a consistent way to expose location information and location-related actions to users.

Many operations described herein are described as being performed by an application that calls an OS or an application launched by the OS. In general, as the term is used herein, an application can be any type of software apart from the OS module(s) that generate location cards. In many examples, the application is software that executes in user mode (or user space), as opposed to kernel mode (or kernel space) used by many OS modules, and the application has a foreground user interface ("UI") component, as opposed to executing only as a background task. Operations described herein as being performing by an OS can be performed by any module or combination of modules of the OS, which in general is any software that manages computer hardware and software resources of a computing system and provides common services for software executing in the computing system.

In the examples described herein, identical reference numbers in different figures indicate an identical component or module. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
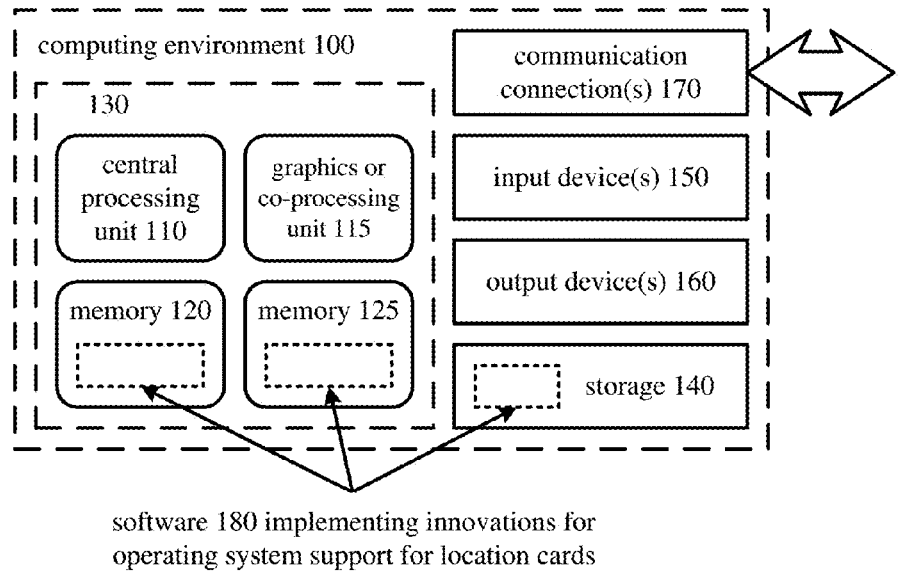
FIG. 1 is a diagram of an example computing system in which some described embodiments can be implemented.

FIG. 1 illustrates a generalized example of an example computing system (100) in which several of the described innovations may be implemented. The computing system (100) is not intended to suggest any limitation as to scope of use or functionality, as the innovations may be implemented in diverse computing systems, including special-purpose computing systems adapted for presentation of location-related information and actions.

With reference to FIG. 1, the computing system (100) includes one or more processing units (110, 115) and memory (120, 125). The processing units (110, 115) execute computer-executable instructions. A processing unit can be a central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for OS support for location cards, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, OS software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for OS support for location cards.

The input device(s) (150) may be a touch input device such as a keyboard, mouse, pen, or trackball, a voice input device, a scanning device, touchscreen, or another device that provides input to the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in modules, being executed in a computing system on a target real or virtual processor. Generally, modules include routines, programs, libraries, objects, classes, components, data structures, etc. that perform particular tasks or implement particular abstract data types. The functionality of the modules may be combined or split between modules as desired in various embodiments. Computer-executable instructions for modules may be executed within a local or distributed computing system.

The terms "system" and "device" are used interchangeably herein. Unless the context clearly indicates otherwise, neither term implies any limitation on a type of computing system or device. In general, a computing system or device can be local or distributed, and can include any combination of special-purpose hardware and/or hardware with software implementing the functionality described herein. The disclosed methods can be implemented using specialized computing hardware configured to perform any of the disclosed methods. For example, the disclosed methods can be implemented by an integrated circuit (e.g., an ASIC (such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Cloud Computing Environments.

Figure 2:
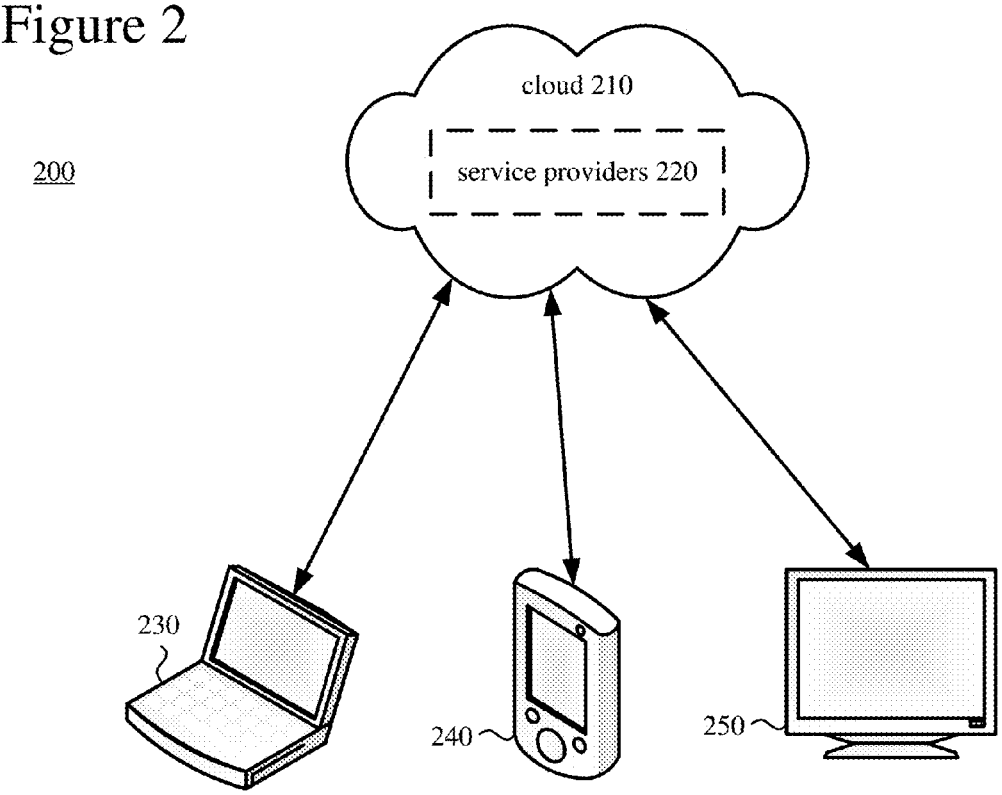
FIG. 2 is a diagram of an example cloud computing environment in which some described embodiments can be implemented.

FIG. 2 illustrates a generalized example of a cloud computing environment (200) in which several of the described innovations may be implemented. In the example environment (200), various types of services (e.g., computing services) are provided by a cloud (210). For example, the cloud (210) can comprise a collection of computing devices, which may be located centrally or distributed, that provide cloud-based mapping services, search services or messaging services to various types of users and devices connected via a network such as the Internet. The computing devices of the cloud computing environment (200) can be used in different ways to accomplish computing tasks. For example, some tasks (e.g., processing user input, presenting a UI, performing certain actions with applications) can be performed on local computing devices (e.g., connected devices 230, 240, 250), while other tasks (e.g., searching for locations, retrieving map information, determining routes, searching for additional details about locations, sharing information about locations) can be performed in the cloud (210).

In the example cloud computing environment (200), the cloud (210) provides services for connected devices (230, 240, 250) with a variety of screen capabilities. A first connected device (230) represents a device with a computer screen (e.g., a mid-size screen). For example, the first connected device (230) could be a personal computer such as desktop computer, laptop computer, notebook computer, netbook computer, or the like. A second connected device (240) represents a device with a mobile device screen (e.g., a small size screen). For example, the second connected device (240) could be a mobile phone, smartphone, personal digital assistant, tablet computer, and the like. A third connected device (250) represents a device associated with a large screen. For example, the third connected device (250) could be a television screen (e.g., a smart television) or another device connected to a television (e.g., a set-top box or gaming console) or the like. Devices without screen capabilities also can be used in the example cloud computing environment (200). For example, the cloud (210) can provide services for one or more computers (e.g., server computers) without displays. As explained below, the way a location card is generated can depend on the screen capabilities of a computing system that presents the location card.

Services can be provided by the cloud (210) through service providers (220) or through other providers of online services (not depicted). Cloud services can be customized to the screen size, display capability, and/or touchscreen capability of a particular connected device (e.g., connected devices 230, 240, and/or 250). In the example cloud computing environment (200), the cloud (210) can provide services to search for locations, services to retrieve map information, services to determine routes, services to search for additional details about locations, services to share information about locations and/or other services described herein, to the various connected devices (230, 240, and/or 250) using, at least in part, the service providers (220). In this case, the service providers (220) can provide a centralized solution for various cloud-based services. The service providers (220) can manage service subscriptions for users and/or devices (e.g., for the connected devices (230, 240, 250) and/or their respective users). For example, a connected device (230, 240 or 250) requests a search for a location, requests map information for the location, requests a search for additional details about the location, requests that a route to the location be determined and/or requests that information about the location be shared with one or more other devices. One or more computing systems in the cloud (210) handle the request(s) (e.g., searching for a location, determining map information for the location, searching for additional details about the location, determining a route to the location and/or sharing information about the location with one or more other devices), and then return results to the connected device (230, 240 or 250) that made the request(s). Different computing systems in the cloud (210) can handle different requests.

III. Operating System Support for Location Cards.

This section describes innovations in the area of presentation of location-related actions and location information. For example, in response to one or more calls from an application, an operating system ("OS") generates a location card. The location card includes a map of a location, additional information about the location and/or one or more action indicators. A user can simply review the content of the location card, which presents location-related details in an effective way. Or, using an action indicator, a user can launch an application to perform a location-related action immediately and directly from the location card. For example, the launched application can be a mapping application that is launched to determine directions to a location, a telephone application that is launched to place a call to a business at the location, a messaging application that is launched to share information about the location with another user, or some other type of application.

Depending on usage scenario, an application can specify different actions to be represented with action indicators in a location card, different location information relevant to users and/or different types of map views to include in the location card. Thus, the location card functionality provides a developer the flexibility to determine which map views, actions, and information to present in a location card. In particular, with a location card, the developer of an application can easily link to functionality of other applications when presenting location information. This can permit the user to complete tasks with the other applications, and then automatically return to the application that requested the location card, thereby enriching the user experience for that application.

At the same time, location cards supported by the OS provide a consistent user experience for display of location information and location-related actions to users. An OS can support location card functionality for first-party applications (provided by the maker of the OS) and third-party applications. In this way, the OS can consistently present location-related actions and location information from application to application.

A. Example Software Architecture for Generating Location Cards.

Figure 3:
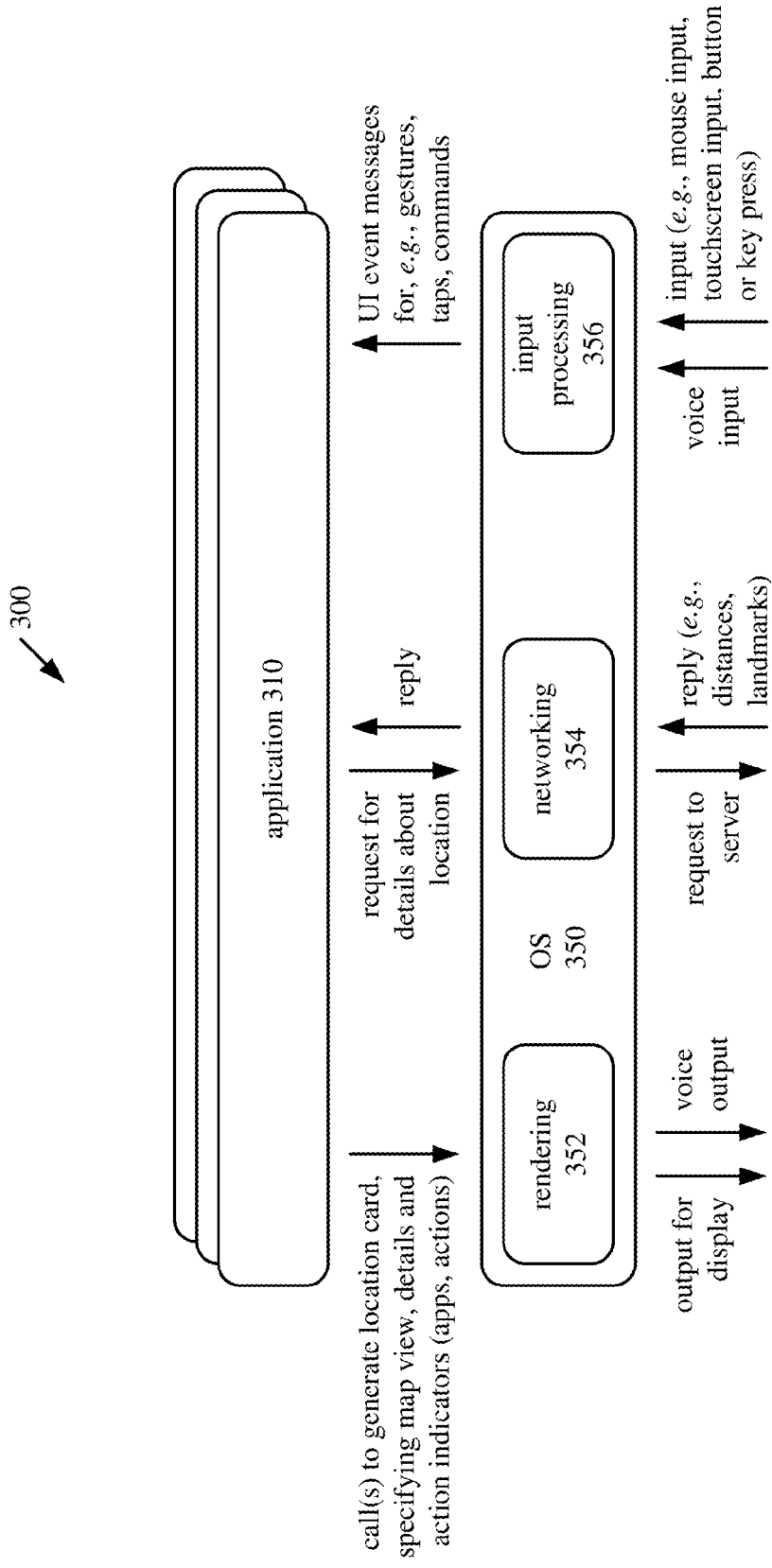
FIG. 3 is a block diagram illustrating an example software architecture in which an OS supports location cards.

FIG. 3 shows an example software architecture (300) for an application (310) that requests that an OS (350) generate a location card. A computing system (e.g., smartphone, tablet computer or other computing device) can execute software organized according to the architecture (300) to generate location cards.

The architecture (300) includes an OS (350) and one or more applications (310) that use services of the OS (350). In FIG. 3, the OS (350) includes components for rendering (e.g., rendering visual output to a display, generating voice output for a speaker), components for networking, and components for input processing. Other components of the OS (350) are not shown. In general, the OS (350) manages user input functions, output functions, storage access functions, network communication functions, and other functions for the computing device. The OS (350) provides access to such functions to the application (310).

A user generates user input that affects generation, output and use of location cards. The user input can be tactile input such as touchscreen input, mouse input, button presses or key presses, or it can be voice input. In an input processing module (356), the OS (350) includes functionality for recognizing taps, finger gestures, or other input to a touchscreen, recognizing commands from voice input, button input or key press input, and creating messages that can be used by the application (310). The application (310) listens for user input event messages from the OS (350). The UI event messages can indicate a panning gesture, flicking gesture, dragging gesture, or other gesture on a touchscreen of the device, a tap on the touchscreen, mouse input, key press input, or another UI event (e.g., from voice input, directional buttons, trackball input).

If appropriate, the application (310) can react to the user input (or another type of notification) by making one or more calls to the OS (350), requesting that the OS (350) generate a location card for a location. In particular, when a UI event message indicates interest of a user in a location, the application (310) requests that the OS (350) generate a location card for the location. For example, the UI event message can be a mouse click, cursor hover, touchscreen tap or other input over a textual or graphical representation of a location on a screen of a display device of the computing system. Or, the UI event message can be a key press, voice command or other input that otherwise indicates interest in a location.

In the call(s) to the OS (350), the application (310) can specify a map view, informational details and/or one or more action indicators for a location card. The OS (350) exposes an interface such as an application programming interface ("API") across which the application (310) makes the call(s). The details of the interface depend on implementation. For example, an API can include a namespace with various object types or classes in it for different location cards. A given object type or class includes a method ("constructor") that can be called to construct an instance of a location card object and one or more methods that can be called to specify properties of the instance. Or, an API can include a single class for a location card, with a constructor method and methods to specify properties of a location card.

In the call(s) that specify the location card, the application (310) can provide one or more parameters that specify a type of map for the location card. For example, for a map of a location, an application (310) can specify whether a mapping service should provide a street view, aerial view, 3D view or other type of map view. The application (310) can also specify layers to be composited over the map with traffic details, weather details, or other details. As another option, the application (310) can specify a custom view (e.g., venue) to use for the map of a location, or request a specialized map such as a subway map for the location. In general, the application (310) can change the type of map view depending on the usage scenario or user settings. The application (310) can also change the map view depending on context. For example, the application (310) can specify a street view for the map if the current location (of the computing device) is far from the location in the location card or the user is moving quickly, but provide a venue view if the current location is close to the location in the location card or the user is moving slowly. Or, the application (310) can specify a map view that omits the area around the current location if it is close to the home of a user, office of the user or other location expected to be familiar to the user, but otherwise provide a map view that includes the current location.

In the OS (350) or an application, a map data store can cache recently used map data. As needed, the map data store gets additional or updated map data for a location card from local file storage or from network resources. The OS (350) mediates access to the storage and network resources. For example, the map data store requests map data for a location card through a storage or networking module of the OS (350), which processes the request, as necessary requests map data from a mapping service and receives a reply, and provides the requested map data to the map data store. As noted, the map data can be photographic image data or graphical data (for boundaries, roads, etc.) at various levels of detail, ranging from high-level depiction of states and cites, to medium-level depiction of neighborhoods and highways, to low-level depiction of streets and buildings. Aside from photographic data and graphical data, the map data can include graphical indicators such as icons or text labels for place names of states, cities, neighborhoods, streets, buildings, landmarks or other features in the map. The organization of the map data depends on implementation. For example, in some implementations, different types of map data are combined into a single layer of map data at a given level of detail. In other implementations, different types of map data are organized in different overlays that are composited during rendering.

In the call(s) that specify the location card, the application (310) can also provide one or more parameters that specify the details about the location. As shown in FIG. 3, to determine the details for the parameter(s) of the call(s), the application (310) can request details about a location from a search service. In this case, the networking module (354) of the OS (350) conveys the request to a server, receives the reply (including, e.g., distance information, information about landmarks or points of interest ("POIs"), reviews, ratings, other commentary, a phone number, email address or other contact information, menus, pricing information, photos, advertising promotions or other information), and conveys the results to the application (310). Or, using an address of a location, the application (310) can use a reverse business lookup service to find details about a location. The application (310) can filter the search results to determine which details to present in a location card, potentially using priority information to favor some types of information over other types of information.

In the call(s) that specify the location card, the application (310) can also provide one or more parameters that specify, for each of the action indicator(s), the linked application and the corresponding action. For example, for an action indicator, the application (310) indicates the application that the OS (350) should launch to perform the corresponding action, and also indicates information that should be provided to the launched application in order to perform the action. The action indicator can represent a primary action, which is expected to be commonly selected from the location card, or a secondary action. For a primary action, the action indicator is directly presented in the location card. In contrast, for a secondary action, the action indicator is presented in a menu or screen accessed through the location card. In one approach, when a developer designs the application (310), the developer can specify actions/commands to be represented in a location card when the application (310) requests generation of the location card. An "action factory" can provide options to the developer for different action/ commands to include in a location card. For example, from a menu of options, the developer selects a particular action/ command associated with a protocol or API call to launch a given application. Or, for a custom action indicator, the developer can specify an action, application, and protocol or API call to launch the application.

Alternatively, the application launched to handle an action for an action indicator can be determined by the OS (350) at run time. In this case, in the call(s) that specify the location card, the application (310) can provide one or more parameters that specify, for an action indicator, a type of application and the corresponding action. For example, for an action indicator, the application (310) indicates the type of application that the OS (350) should launch to perform the corresponding action, and also indicates information that should be provided to the launched application in order to perform the action. At run time, the OS (350) selects a default application for the specified type of application. Or, the OS (350) presents to the user a menu of suitable applications, and the user selects the application to launch to handle the corresponding action. The OS (350) can store the selection by the user for use in generating location cards, going forward.

In the call(s) that specify the location card, the application (310) can also provide one or more parameters that specify font size, font color, font type, border width, border color, border type, height, width, position, background color and/or another attribute for the location card. For example, the application (310) can manage the graphical details of the location card depending on application settings, user settings, current lighting levels or other factors. In this way, the application (310) can directly control the appearance of the location card. Or, as another option to specify the appearance of a location card, the application (310) can specify a style for a location card, where the style indicates a combination of property settings.

Finally, in the call(s) that specify the location card, the application (310) can provide one or more parameters that specify a template for the location card. For example, the template is an extensible application markup language ("XAML") template that specifies the overall "look and feel" of a location card (e.g., layout, properties of appearance, animations or other behaviors of UI elements). XAML allows a developer to define and link UI elements for a location card using declarative statements. Alternatively, the template is provided in another language. The OS (350) can populate properties, values, fields, etc. of a template using default values and/or depending on the parameters of the call(s) that specify the location card. The OS (350) can use different templates for different usage scenarios (see below), different form factors (e.g., screen sizes) of computing systems, or different screen orientations.

A location card can be implemented as a hierarchical composition, or tree, of UI elements. For example, a top-level location card includes UI elements for a map portion, details portion and action indicators portion. The map portion can include sub-elements for map layers, zooming controls, scrolling controls and other features. The details portion can include sub-elements for various textual information and/or graphical information. The action indicators portion can include sub-elements such as buttons with labels for various action indicators.

In response to the call(s), the OS (350) generates a location card. The OS (350) can create a structure in memory of the computing system (e.g., based on a template and parameters of the call(s)). The structure defines visual elements and attributes for the map portion of the location card, visual elements and attributes for the additional details of the location card, and/or visual elements and attributes for the action indicator(s) of the location card. For example, a module of the OS (350) creates or modifies a file in XAML or another language for the location card, then converts the file for the location card to an object instance or other run-time representation of the location card, which can be rendered for display.

After the location card is generated, the OS (350) outputs the location card for display. For example, a rendering module (352) of the OS (350) produces an image (or surface) based on the object instance or other run-time representation of the location card. The surface is used to update the screen of a display device. When the location card is structured as a hierarchy of UI elements, the rendering module (352) can traverse the hierarchy, compositing UI elements of the hierarchy from back to front onto the surface to be displayed. The hierarchy of UI elements is retained in memory, such that changes to individual UI element can be reflected in the hierarchy and cause updates to the surface during subsequent rendering operations. The rendering module (352) can also provide output to the OS (350) for voice output over a speaker or headphones. The exact operations performed as part of the rendering depend on implementation.

The location card can be rendered as a pop-up menu over other content, as a flyout object over other content, as a control that replaces other content or as some other graphical feature. Typically, the location card is hosted, or presented, within the context of the application (310) that requested the location card, and the focus returns to that application when the location card closes.

As the current location of the computing system changes, the OS (350) can automatically update the map with a simple translation animation. Or, the OS (350) can automatically re-position an icon that indicates the current location of the computing system as the current location is updated. The OS (350) can also react to a change in the type of view (e.g., to switch from a street view to an aerial view, or vice versa) or a change in details to be rendered (e.g., to show or hide traffic details). POIs on a map can change depending on which information in the location card is selected with user input.

After the location card is output for display, a user can actuate an action indicator of the location card. In response, the OS (350) launches the application linked to the action indicator and provides information to the launched application, so that the launched application can perform the action for the action indicator. For example, to launch the application associated with an action indicator, the OS (350) calls an API method or follows some other protocol for launching the application, passing information to the launched application. Typically, the launched application has a UI component such as a frame that is output for display. In some cases, however, the launched application can be a background task having no UI component.

Depending on the action indicator(s) specified for a location card, the launched application can be a mapping application (to get directions to a location), a telephone application (to place a telephone call), a messaging application (to share information about a location), document viewer (to view a document about a location), file editor (to edit information about a location) or some other type of application.

When the launched application is closed, the OS (350) removes any view for the launched application from the display (updating the surface to be displayed) and updates the display. When the location card is closed, the OS (350) removes the location card from the display (updating the surface to be displayed) and updates the display. For example, content of the application (310) is output for display, and the OS (350) returns focus to the application (310).

Alternatively, the OS (350) includes more or fewer modules. A given module can be split into multiple modules, or different modules can be combined into a single module.

B. Techniques for Requesting and Generating Location Cards.

FIG. 4a illustrates a generalized technique (401) for requesting a location card. The technique (401) for requesting a location card can be performed by an application.

To start, the application receives (410) a notification that indicates interest in a location. For example, the notification that indicates interest in the location is user input such as mouse input or touchscreen input over a representation of the location on a screen of a display device of the computing system. This can be a mouse click, cursor hover, touchscreen tap or other input over a textual or graphical representation of the location. Or, the user input can be key press input, voice input or other input that otherwise indicates interest in the location. Or, the notification received by the application is an event triggered within the application, based on an association recognized by the application between the location and a user profile/user preferences.

The application makes (420), through an interface of an OS, one or more calls that specify a location card for the location. The location card includes (a) a map for the location, (b) details about the location, and/or (c) one or more action indicators. Each of the action indicator(s) is linked to an application capable of performing a corresponding action. For example, the call(s) can include parameters as described in section III.A. The application can adjust the parameters in the call(s) that specify the location card based on various criteria. For example, when setting the parameters of the call(s), the application can:

(a) evaluate the size and/or orientation of a screen of a display device of the computing system, and adjust at least some of the call(s) that specify the location card based at least in part on results of the evaluating;

(b) evaluate one or more application settings, user settings or conditions of the computing system and, based on results of the evaluating, determine a type of the map;

(c) determine a custom view of the location, where the custom view is provided for use as the map for the location;

(d) request a search for an address of the location, receive search results, and filter the search results to determine the details about the location to include in the location card;

(e) for each of the action indicator(s), identify relevant information about the location, determine the corresponding action for the relevant information, and determine the application capable of performing the corresponding action; and/or (f) adjust the parameters of the call(s) in some other way.

FIG. 4b illustrates a generalized technique (402) for generating a location card. The technique (402) for generating a location card can be performed by one or more module(s) of an OS.

With reference to FIG. 4b, in response to the call(s) through the interface of the OS, the OS generates (430) a location card for a location. The location card includes (a) a map for the location, (b) details about the location, and/or (c) one or more action indicators. Each of the action indicator(s) is linked to an application capable of performing a corresponding action. For example, the call(s) can include parameters as described in section III.A.

The OS can adjust the location card depending on various factors. For example, the OS evaluates size and/or orientation of a screen of a display device of the computing system, and then adjusts the location card based at least in part on results of the evaluating. Or, as another example, the OS determines which of the map, the details and the action indicator(s) to include in the location card based on priority information, and then adjusts the location card based at least in part on results of the evaluating. Or, the OS adjusts the location card in some other way.

The OS then outputs (440) the location card for display. The location card can be rendered in various ways. For example, the location card can replace the content of the application that requested the location card. In this case, when the user closes the location card, the OS removes the location card from display (updating the surface to be displayed) and outputs the previous content of the application for display. Or, the location card can be rendered for display as a flyout object on top of other, previously rendered content (for the application that requested the location card). In this case, when the user provides user input outside the flyout object, the OS removes the flyout object from display (updating the surface to be displayed) and outputs the other content for display. Or, the location card can be rendered as a pop-up menu or some other graphical feature. A location card can be displayed individually. Or, the location card can be part of a stack of multiple location cards that are output for display.

Figure 5A:
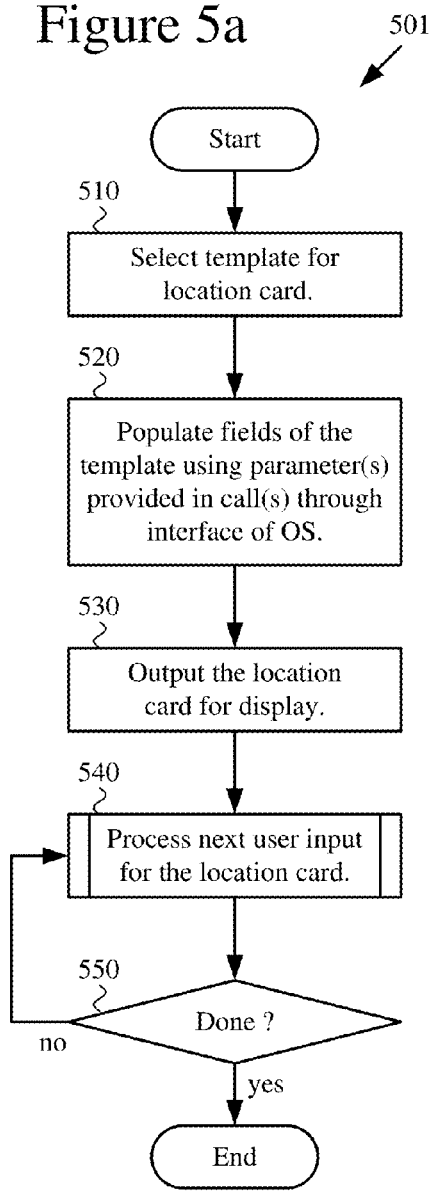
FIGS. 5a-5c are flowcharts illustrating an example technique for generating a location card.
Figure 5B:
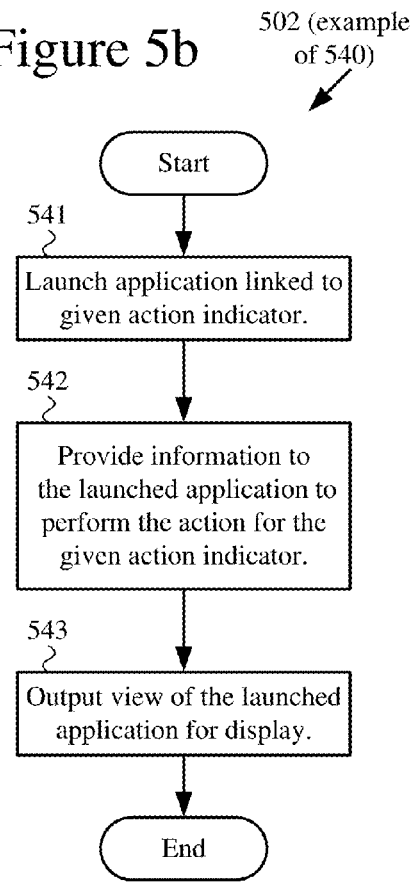
Figure 5C:
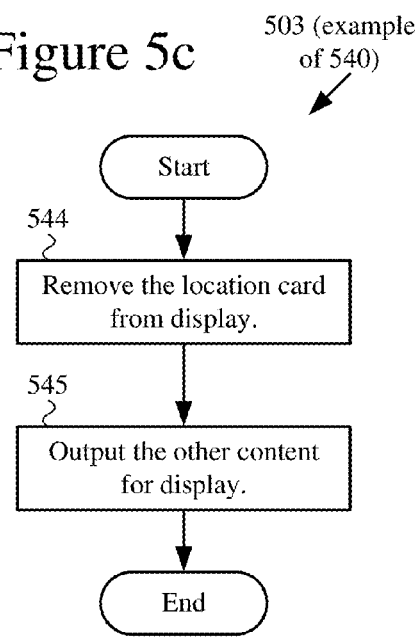

FIGS. 5a-5c illustrate an example technique (501) for generating a location card. The technique (501) can be performed by one or more modules of an OS.

To start, to generate the location card, the OS selects (510) a template for the location card and populates (520) at least some fields of the template using parameters provided in the call(s) to generate the location card. For example, as described in section III.A, the OS selects between multiple available templates, and then populates values of properties, attributes, fields, etc. of the template based on the parameters in the call(s) and default parameters.

The OS outputs (530) the location card for display and processes (540) user input for the location card. For example, the OS outputs the location card for display as described in section III.A. The way that the OS processes (540) the user input depends on the user input.

For example, FIG. 5b shows a technique (502) for processing user input for actuation of an action indicator in the location card. In response to actuation of a given action indicator of the location card, the OS launches (541) the application linked to the given action indicator, provides (542) information to the launched application in order for the launched application to perform the corresponding action for the given action indicator, and outputs (543) a view, if any, of the launched application for display. The launched application can further process user input according to its normal processing. When the launched application is closed, the OS can remove the view of the launched application, if any, from display (updating the surface to be displayed), and output the location card for display. In this way, after completion of the action for an action indicator, the focus can return to the location card.

As another example, FIG. 5c shows a technique (503) for processing user input for the close of the location card. For example, if the location card is rendered as a flyout object, the location card is closed when any user input outside the location card is received. Or, if the location card is rendered as a pop-up control, the location card is closed in response to actuation of a "close" or "X" button. In any case, when the location card is closed, the OS removes (544) the location card from display (updating the surface to be displayed) and outputs (545) for display other content that was under the location card.

The OS can process other user input for the location card in other ways. For example, the OS can respond to user interest in details about a POI around a location by highlighting the POI in the map portion of the location card.

C. Examples of Generation and Use of Location Cards.

Figure 6A:
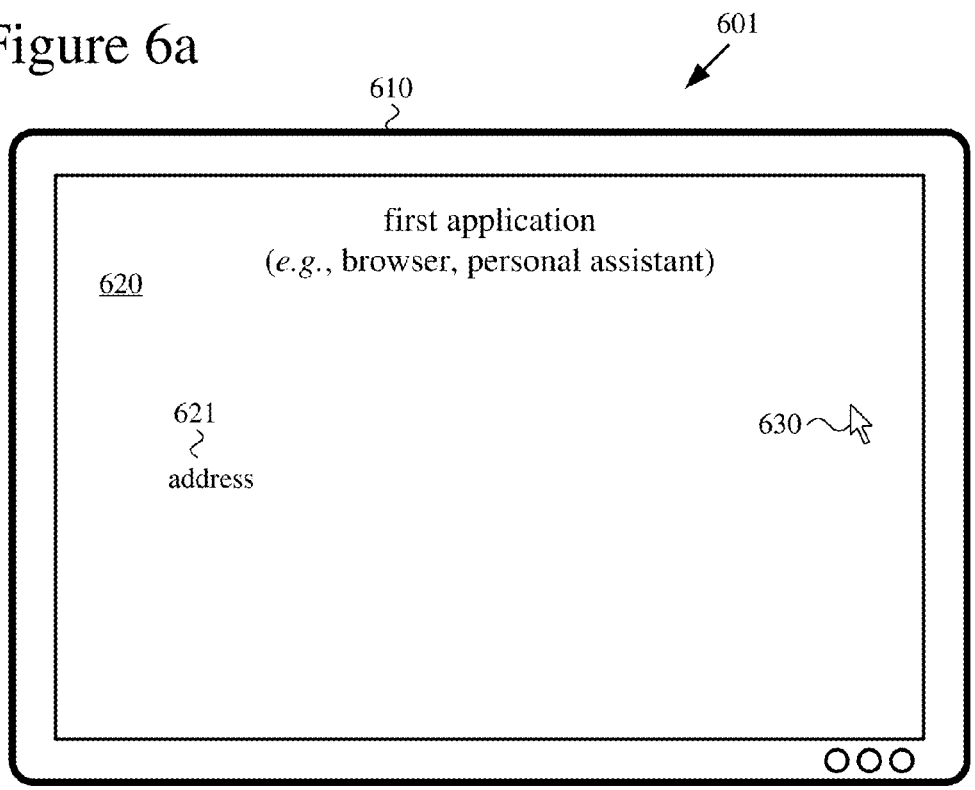
Figure 6B:
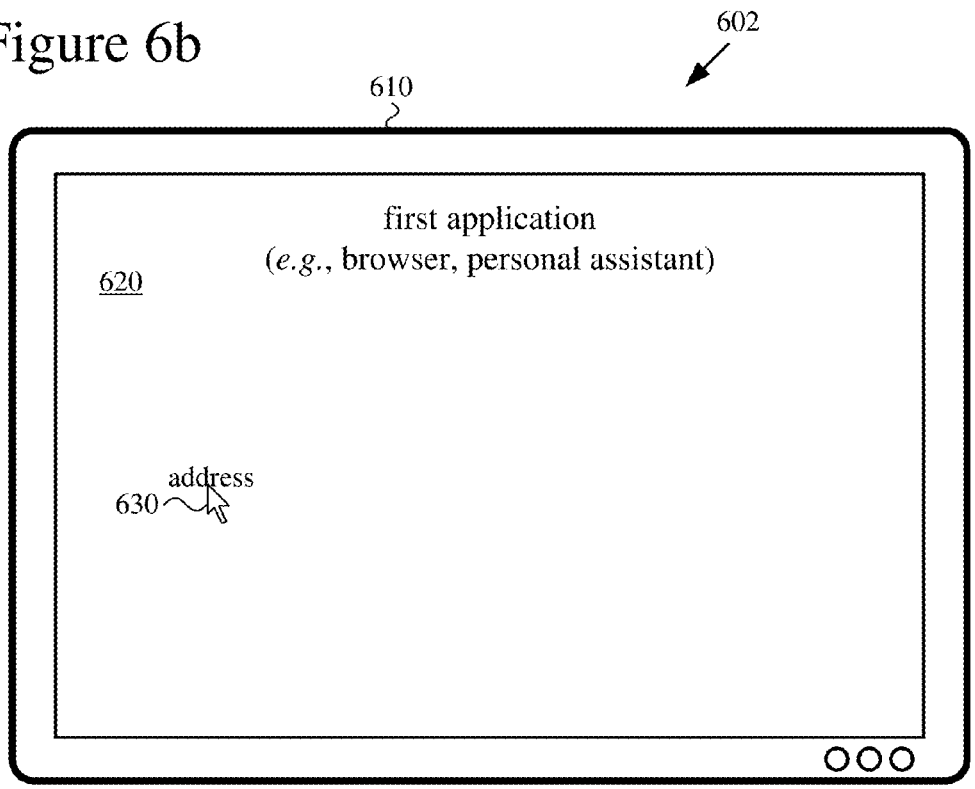

FIGS. 6a-6d illustrate the creation and use of a location card in a computing system with a medium-size screen, such as a personal computer. In the view (601) shown in FIG. 6a, the display device (610) includes a screen depicting content (620) of a first application. For example, the first application is a Web browser or software-based personal assistant. The content (620) includes an address (621). Other details of the content (620) are omitted to simplify the example. In FIG. 6a, a cursor (630) of the UI of the computing system hovers over the content (620) at a position far from the address (621). In the view (602) shown in FIG. 6b, the cursor (630) has been moved to hover over the address (621). This triggers, as shown in the view (603) of FIG. 6c, the generation and output for display of a location card (640) that overlays the content (620) of the first application. (Alternatively, the location card (640) can be automatically requested by a software-based personal assistant, based on an association recognized between a location and a user profile/user preferences.) In FIG. 6c, the location card (640) is rendered as a flyout object. The location card (640) includes a details portion (642), action indicators portion (644) with multiple action indicators (for action 1, action 2, and action 3) and a map portion (646).

In the view (604) shown in FIG. 6d, the cursor (630) has been moved to hover over the action indicator for action 1. This triggers the launch of a second application, whose content (650) overlays the location card (640) and the content (620) of the first application. For example, the second application is a telephone application, mapping application or messaging application. When the second application closes (not shown), its content (650) is removed from the screen, potentially returning to the view (603) of FIG. 6c. When the user moves away from the location card (640), the location card (640) closes and is removed from the screen.

FIGS. 7a-7c illustrate the creation and use of a location card in a computing device with a small screen, such as a smartphone, tablet computer or other mobile computing device. In the view (701) shown in FIG. 7a, the computing device (710) includes a screen depicting content (720) of a first application (e.g., Web browser or software-based personal assistant). The content (720) includes an address (721), but other details are omitted to simplify the example. The computing device (710) accepts touchscreen input. In FIG. 7b, touchscreen input has been received over the address (721). This triggers, as shown in the view (702) of FIG. 7b, the generation and output for display of a location card (740) that overlays the content (720) of the first application. (Alternatively, the location card (740) can be automatically requested by a software-based personal assistant, based on an association recognized between a location and a user profile/user preferences.) In FIG. 7b, the location card (740) is rendered as a control that replaces the content of the first application. The location card (740) includes a details portion (742), and action indicators portion (744) with multiple action indicators (for action 1, action 2, and action 3) and a map portion (746).

In the view (703) shown in FIG. 7c, additional touchscreen input has been received over the action indicator for action 1. This triggers the launch of a second application (e.g., telephone application, mapping application, messaging application), whose content (750) replaces the location card. When the second application closes, the content (750) of the second application is removed from the screen, and the location card (740) is restored, as in the view (702) of FIG. 7b. Then, when the user closes the location card (740), the location card (740) is removed from the screen, and the content (720) of the first application is restored, as in the view (701) of FIG. 7a.

Figure 8A:
Figure 8B:
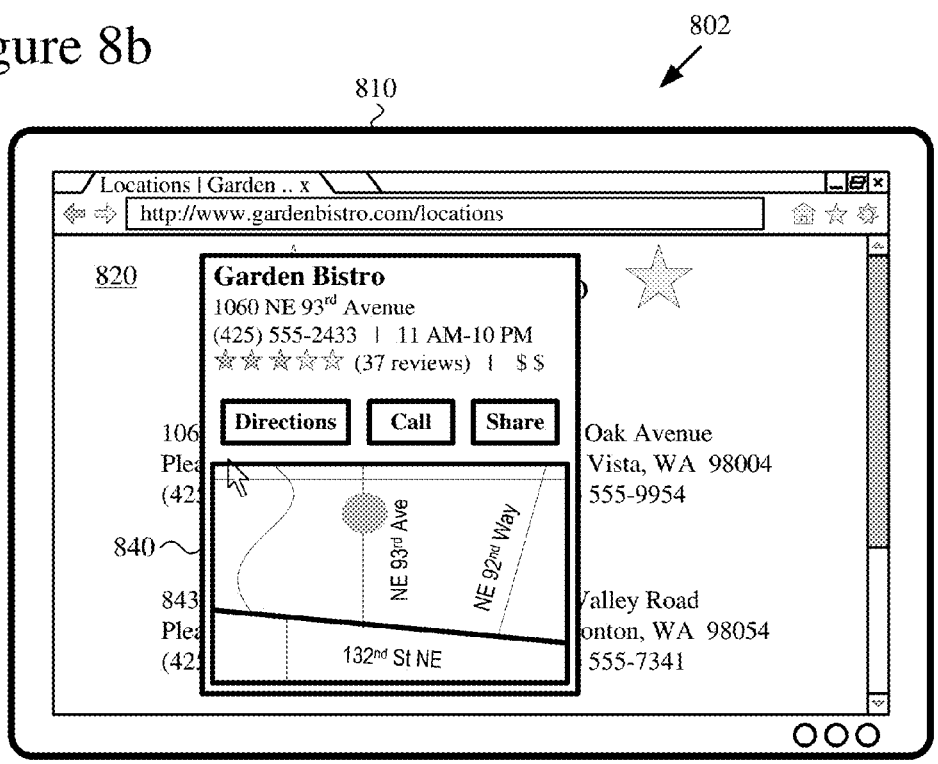

FIGS. 8a-8c illustrate the creation and use of a location card over a Web browser. In the view (801) shown in FIG. 8a, the display device (810) includes a screen depicting content (820) of a Web browser. The content (820) includes multiple addresses. In FIG. 8a, a cursor (830) of the UI of the computing system hovers over the content (820) far from any of the addresses. In the view (802) shown in FIG. 8b, the cursor (830) has been moved to hover over one of the addresses. This triggers, as shown in the view (802) of FIG. 8b, the generation and output for display of a location card (840) that overlays the content (820) of the Web browser. In FIG. 8b, the location card (840) is rendered as a flyout object. The location card (840) includes a details portion with the name, address, telephone number, business hours, rating information, and pricing information for a business. The action indicators portion of the location card (840) includes action indicators for Directions, Call and Share actions, and the map portion of the location card (840) includes map details for the business.

In the view (803) shown in FIG. 8c, the cursor (830) has been moved to hover over the action indicator for the Call action. This triggers the launch of a telephone application, whose content (850) overlays the location card (840) and the content (820) of the Web browser. When the telephone application later closes (not shown), its content (850) is removed from the screen, potentially returning to the view (802) of FIG. 8b. When the user moves away from the location card (840), the location card (840) closes and is removed from the screen.

D. Example Configurations of Location Cards.

FIG. 9 illustrates a generalized location card (900) and accompanying example location card (901). The generalized location card (900) includes a details portion (910), action indicators portion (920) and map portion (930).

The details portion (910) provides information which a user can review at a glance. This information includes, for example, any of name, address, telephone number, review information, rating information, pricing information, distance, travel time, etc. for a location. Alternatively, the details portion (910) includes other textual and/or graphical information.

The action indicators portion (920) shows one or more action indicators to help a user complete a task by directly linking to an application that can be used to complete that task. Example actions include getting directions to a location, saving the location to a directory or favorites list, sharing information about the location with another user, editing information about the location, calling a telephone number associated with the location, and determining POIs near the location. Alternatively, the action indicators portion (920) includes action indicators for other and/or additional actions. The action indicators can be for primary actions, which are directly represented in the action indicators portion (920), or secondary actions, which are not directly represented in the action indicators portion (920) but can be accessed through the location card (900).

The map portion (930) displays a map view, which can be a road map, venue map, aerial map, street map, traffic map, or some other kind of map. The map portion (930) can show indicators for one or more POIs, or show no POIs.

The example location card (901) of FIG. 9 includes a details portion (911), action indicators portion (912) and map portion (913), whose contents are described above with reference to FIG. 8b.

FIG. 10 shows an alternative configuration for a generalized location card (1000) and accompanying example location card (1001). The generalized location card (1000) includes a pivot control (1010) usable to switch between different pages (1020) for details about a location, action indicators for the location and a map view of the location.

For example, the location card (1000) can switch pages in response to a flick gesture or pan gesture on a touchscreen, in response to mouse wheel input from a mouse, or in response to other user input. The different pages (1020) can include content as described with reference to the different portions of the location card (900) FIG. 9.

In the example location card (1001) of FIG. 10, the initial state (1011) of the pivot control is to show the "details" page (1021). After responding to user input, the state (1012) of the pivot control is to show the "actions" page (1022). Then, after responding to additional user input, the state (1013) of the pivot control is to show the "map" page (1023). The contents of the pages (1021, 1022, 1023) are as described with reference to FIG. 8b.

Alternatively, a location card can be rendered in another configuration, e.g., carousel control.

An application or the OS can change the configuration of a location card (e.g., switching templates) or change which information is shown in a location card depending on the form factor of a computing device, the screen orientation of the computing device, a usage scenario, user settings, application settings and/or another factor. For example, on a device with a smaller screen, the application specifies (or the OS determines) that a smaller location card should be generated, showing a condensed version of details, map information and/or action indicators likely to be important to the user. To save space, details and/or action indicators can overlay the map portion of a location card. Also, depending on available space, action indicators can be presented for more or fewer primary actions versus secondary actions. As screen size increases, more details, more map information and/or more action indicators can be shown in the location card.

Figure 11A:
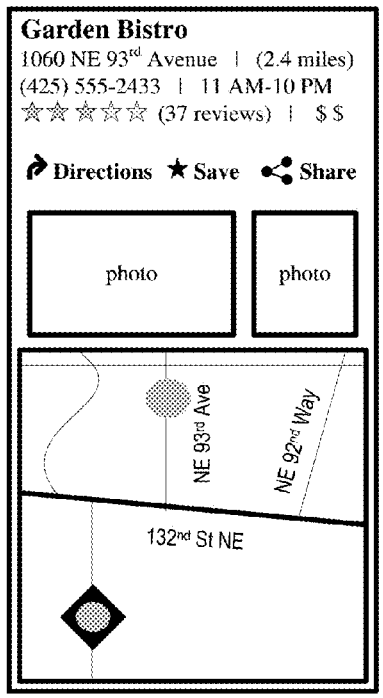
Figure 11B:
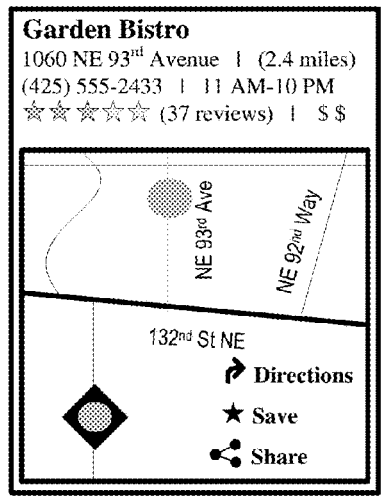
Figure 11C:
Figure 11D:
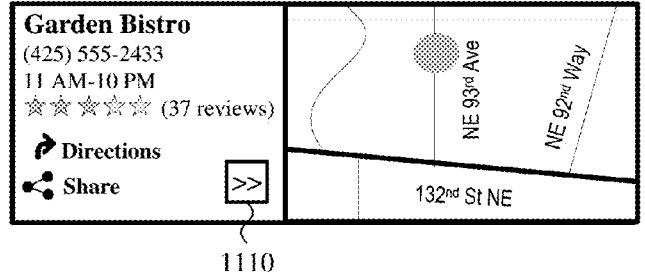

FIGS. 11a-11d illustrate example location cards (1101, 1102, 1103, 1104) that have been changed to suit different form factors of devices. The location card (1101) shown in FIG. 11a includes name, address, distance, telephone number, business hours, rating information, and pricing information for a business, as well as photos for the business. The location card (1101) includes action indicators for Directions, Save and Share actions, and the map view shows the location for the location card and current location of the user's computing device. For a smaller screen, the location card (1102) of FIG. 11b shows the same map information and details as the location card (1101) of FIG. 11a, but omits the photos. Also, in FIG. 11b, the action indicators overlay the map information to save space. In FIG. 11c, the location card (1103) includes a condensed version of details and smaller map view, no longer showing the current location. Finally, in FIG. 11d, the location card (1104) includes a condensed version of details and the smaller map view, and the Save action has been relegated to the status of a secondary action. The location card (1104) still includes action indicators for the Directions and Share actions, but the Save action is accessible through a menu that pops up upon actuation of the chevron button (1110).

The application or OS can choose different types of details, different actions and/or different types of map information depending on priority information. For example, the priority information can prioritize map information over actions, and prioritize actions over additional details. As another example, the priority information can prioritize some types of details (e.g., name, telephone number) over other types of details (e.g., address, reviews). Or, as another example, the priority information can prioritize some types of actions over other types of actions. The priority information can change depending on usage scenario. For example, for a usage scenario, the priority information can include a set of primary actions and a set of secondary actions. The primary actions are used for tasks expected to be most common, which developers seek to expose to users at the top level of the location card. The secondary actions are used for tasks expected to be less common, which need not be at the forefront of the location card. In some scenarios, the location card can omit action indicators.

Figure 12:
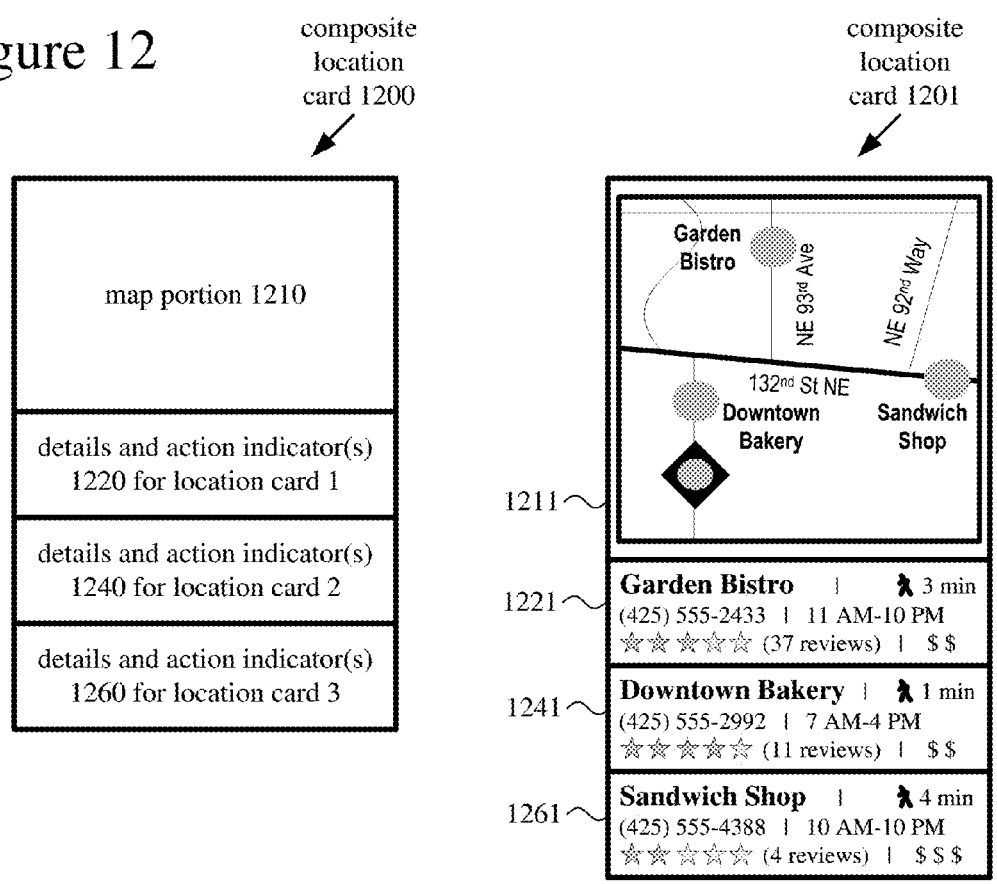

A location card can be output for a single location, as shown in FIGS. 9, 10 and 11a-11d. Alternatively, location cards can be stacked in a list. FIG. 12 shows a generalized composite location card (1200) and an example composite location card (1201). A composite location card can be used, for example, to show search results that include multiple locations.

The generalized composite location card (1200) includes a map portion (1210), details and action indicator(s) (1220) for location card 1, details and action indicator(s) (1240) for location card 2, details and action indicator(s) (1260) for location card 3, and so on. In FIG. 12, the details portion and action indicator(s) portion for a given location card are condensed into a single portion of the composite location card (1200). The map information, details and action indicator(s) that are included in the composite location card (1200) can be specified by an application.

The example composite location card (1201) includes a map portion (1211) in which several locations are indicated on a street map and labeled. The map portion (1211) also shows the current location (indicated by the diamond with a circle in it). For each of the three locations, a location card (1221, 1241, 1261) shows condensed details and a single action indicator. The condensed details (name, telephone number, business hours, rating information, pricing information and time to destination) fit in a relatively small area. For a primary action, the single action indicator—to get directions to a location—is depicted as a small walking figure.

E. Example Usage Scenarios for Location Cards.

An application can specify different location cards for different usage scenarios. Or, an OS can adjust location cards for different usage scenarios. In general, the application or OS can adjust map information, details and/or actions of a location card to tailor the location card to the anticipated needs of a user. This provides flexibility to an application developer to specify actions and information specific to the goals of an application, while still providing a consistent user experience for how location cards are rendered by the OS and used. Location cards can be used in various scenarios.

For example, a user can ask a software-based personal assistant for information about a location such as a business, restaurant, generic place, venue or transit station, and the resulting information can be presented with a location card. The details shown in the location card can depend on the type of location—e.g., name, address and telephone number for a generic business; name, review information and menu for a restaurant; distance and travel time for a transit stop; and so on. Similarly, the actions represented as primary actions in a location card can depend on the type of location—e.g., getting directions, placing a telephone call or sharing a location for a generic business; getting directions, reading review information, or placing a telephone call for a restaurant; getting an alternate route for a transit stop; and so on. Less common actions (such as saving a location or sharing a location) can be presented as secondary actions. As another example, a software-based personal assistant can use a location card to present information about an itinerary or schedule. Alternatively, based on a user profile or user preferences recorded by a software-based personal assistant, the software-based personal assistant can automatically request that the OS generate a location card, so as to recommend a place to the user or notify the user about a place.

When browsing a Web page with a Web browser, a user can indicate interest in an address for a location. The Web browser can request the OS to present information about the location in a location card. As explained above, the details shown and actions represented in a location card can depend on the type of location.

Or, as another example, when processing a specific address with a mapping application or messaging application, the application can request the OS to present information about the location in a location card. Or, a calendar application can use a location card to present information about the location of an event on a calendar. Or, a contacts application can use a location card to present location information for a contact. As explained above, the details shown and actions represented in a location card can depend on the type of location. The details shown and actions represented in a location card can also depend on the type of application—e.g., sharing a location for a messaging application; getting directions, an alternate route or traffic details for a mapping application; re-scheduling or re-locating an event for a calendar application; sending a text message or placing a telephone call for a contacts application; and so on. The details shown and actions represented can also depend on context in other ways. For example, if a mapping application shows traffic data, the mapping application can specify that a location card include an action indicator to determine an alternate route to a location as a primary action, but otherwise present an action indicator for that action as a secondary action.

As another example, an application can store information about locations (e.g., a location where a car is parked, a series of locations for errands), and request that a location card be generated to present information about the location(s). The location card can include action indicators to edit a location (change address or change position within a venue), get directions to a location, or share a location. Such actions are expected to be frequently used when retrieving or storing a location (e.g., editing to fix a problem with inaccurate placement of a location for a parking space, getting directions to a parking space, sharing the location of a parking space).

F. Alternatives and Variations.

In many of the examples described herein, locations cards are generated and rendered by an OS, but not persisted to storage. Alternatively, a location card can be stored in persistent form. An application or OS can store and retrieve information for the location card for later use of the location card.

In many of the examples described herein, a single application requests and uses a location card, which the OS generates. A different application requests and uses its own location card, generated by the OS. Alternatively, a location card can be shared by multiple applications.

In many of the examples described herein, an application retrieves information about a location, provides at least some of the retrieved information to the OS to generate a location card, then discards the information. Alternatively, the application can retain the retrieved information in a data model for the location. In this approach, the application can store information about a location and provide it to the OS to generate location cards for different situations, without retrieving the information multiple times. For example, a mapping application can buffer information about a location in a data model, then provide an appropriate subset of the buffered information to the OS to generate a location card for a given situation such as presenting search results (showing more details), navigation, driving (showing less details), and so on. The application can select different subsets of the buffered information for location cards in different situations.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing system, a method comprising:
   in an operating system of the computing system, in response to one or more calls through an application programming interface ("API"), generating a location card for a location, the location card including (a) a map for the location, (b) details about the location, and (c) one or more action indicators, each of the one or more action indicators being linked to an application for performing a corresponding action, wherein the operating system supports location card functionality for first-party applications and for third-party applications that make calls through the API, wherein the generating the location card includes:
      evaluating size and/or orientation of a screen of a display device of the computing system; and
      adjusting the location card based at least in part on results of the evaluating; and outputting the location card for display.

2. The method of claim 1 wherein the one or more calls provide one or more of:
   one or more parameters that specify a type of the map;
   one or more parameters that specify the details about the location;
   one or more parameters that specify, for each of the one or more action indicators, the linked application and the corresponding action;
   one or more parameters that specify one or more of font size, font color, font type, border width, border color, border type, height, width, position and background color for the location card; and
   one or more parameters that specify a template for the location card.

3. The method of claim 1 wherein the generating the location card further includes creating a structure in memory of the computing system, the structure defining visual elements and attributes for the map, visual elements and attributes for the details, and visual elements and attributes for the one or more action indicators.

4. The method of claim 1 wherein the generating the location card further includes:
   selecting a template for the location card; and
   populating at least some fields of the template using one or more parameters provided in the one or more calls.

5. The method of claim 1 wherein, as part of the outputting, the location card is rendered for display as a flyout object over other content previously rendered for display, the method further comprising, in response to receipt of user input outside the flyout object:

removing the flyout object from display; and
outputting the other content for display.

6. The method of claim 1 wherein the generating further includes:
   determining which of the map, the details and the one or more action indicators to include in the location card based on priority information; and
   adjusting the location card based at least in part on results of the determining.

7. The method of claim 1 further comprising, in response to actuation of a given action indicator among the one or more action indicators:
   launching the application linked to the given action indicator;
   providing information to the launched application to perform the corresponding action for the given action indicator; and
   outputting a view, if any, of the launched application for display.

8. The method of claim 7 further comprising:
   removing the view, if any, of the launched application from display; and
   outputting the location card for display.

9. The method of claim 1 wherein the location card is part of a stack of multiple location cards output for display.

10. One or more computer-readable memory components storing computer-executable instructions for causing a computing system programmed thereby to perform operations comprising:
    receiving a notification that indicates interest in a location; and
    making, through an application programming interface ("API") of an operating system of the computing system, one or more calls that specify a location card for the location, the location card including (a) a map for the location, (b) details about the location, and (c) one or more action indicators, each of the one or more action indicators being linked to an application for performing a corresponding action, wherein the operating system supports location card functionality for first-party applications and for third-party applications that make calls through the API;
    evaluating size and/or orientation of a screen of a display device of the computing system; and
    adjusting at least some of the one or more calls that specify the location card based at least in part on results of the evaluating.

11. The one or more computer-readable memory components of claim 10 wherein the one or more calls provide one or more of:
    one or more parameters that specify a type of the map;
    one or more parameters that specify the details about the location;
    one or more parameters that specify, for each of the one or more action indicators, the linked application and the corresponding action;
    one or more parameters that specify one or more of font size, font color, font type, border width, border color, border type, height, width, position and background color for the location card; and
    one or more parameters that specify a template for the location card.

12. The one or more computer-readable memory components of claim 10 wherein the operations further comprise, before the making the one or more calls that specify the location card:
    evaluating one or more settings and/or one or more conditions of the computing system; and
    based on results of the evaluating, determining a type of the map.

13. The one or more computer-readable memory components of claim 10 wherein the operations further comprise, before the making the one or more calls that specify the location card:
    determining a custom view of the location, wherein the custom view is used as the map for the location.

14. The one or more computer-readable memory components of claim 10 wherein the operations further comprise, before the making the one or more calls that specify the location card:
    requesting a search for an address of the location;
    receiving results of the search; and
    filtering the results of the search to determine the details about the location to include in the location card.

15. The one or more computer-readable memory components of claim 10 wherein the operations further comprise, before the making the one or more calls that specify the location card, for each of the one or more action indicators:
    identifying relevant information about the location;
    determining the corresponding action for the relevant information; and
    determining the application capable of performing the corresponding action.

16. The one or more computer-readable memory components of claim 10 wherein the one or more action indicators include at least one action indicator for a primary action to be presented directly in the location card and at least one action indicator for a secondary action not to be presented directly in the location card.

17. The one or more computer-readable memory components of claim 10 wherein the notification that indicates interest in the location is mouse input or touchscreen input over a representation of the location on a screen of a display device of the computing system.

18. One or more computer-readable memory components storing computer-executable instructions for causing a computing system programmed thereby to perform operations comprising:
    in response to one or more calls through an interface of an operating system, generating a location card for a location, the location card including (a) a map for the location, (b) details about the location, and (c) one or more action indicators, each of the one or more action indicators being linked to an application for performing a corresponding action, wherein the generating the location card includes:
    selecting a template for the location card;
    populating at least some fields of the template using one or more parameters provided in the one or more calls; and
    outputting the location card for display, wherein the location card is part of a stack of multiple location cards output for display.

19. One or more computer-readable media storing computer-executable instructions for causing a computing system programmed thereby to perform operations comprising:
    in an operating system of the computing system, in response to one or more calls through an application programming interface ("API"), generating a location card for a location, the location card including (a) a map for the location, (b) details about the location, and (c) one or more action indicators, each of the one or more action indicators being linked to an application for performing a corresponding action, wherein the operating system supports location card functionality for first-party applications and for third-party applications that make calls through the API, and wherein the generating the location card includes creating a structure in memory of the computing system, the structure defining visual elements and attributes for the map, visual elements and attributes for the details, and visual elements and attributes for the one or more action indicators; and outputting the location card for display.

20. The one or more computer-readable memory components of claim 19 wherein the one or more calls provide one or more of:

one or more parameters that specify a type of the map;

one or more parameters that specify the details about the location;

one or more parameters that specify, for each of the one or more action indicators, the linked application and the corresponding action;

one or more parameters that specify one or more of font size, font color, font type, border width, border color, border type, height, width, position and background color for the location card; and one or more parameters that specify a template for the location card.

21. The one or more computer-readable memory components of claim 19 wherein the generating further includes:

determining which of the map, the details and the one or more action indicators to include in the location card based on priority information; and adjusting the location card based at least in part on results of the determining.

22. The one or more computer-readable memory components of claim 19 wherein the operations further comprise, in response to actuation of a given action indicator among the one or more action indicators:

launching the application linked to the given action indicator;

providing information to the launched application to perform the corresponding action for the given action indicator; and outputting a view, if any, of the launched application for display.

23. The one or more computer-readable memory components of claim 19 wherein the location card is part of a stack of multiple location cards output for display.

* * * * *